(12) United States Patent
Kollodge et al.

(10) Patent No.: US 6,263,609 B1
(45) Date of Patent: Jul. 24, 2001

(54) ADAPTER FOR AN OFFSET FISHING ROD COUPLING

(76) Inventors: Jerome Kollodge; Deborah Kollodge, both of P.O. Box 184, Sisters, OR (US) 97759

( * ) Notice: Subject to any disclaimer, the term of this patent is extended or adjusted under 35 U.S.C. 154(b) by 0 days.

(21) Appl. No.: 09/346,512

(22) Filed: Jul. 1, 1999

(51) Int. Cl.⁷ .................................................. A01K 87/00
(52) U.S. Cl. ........................ 43/25; 43/4.5; 43/26; 43/24
(58) Field of Search .................. 43/18.1, 25, 24, 43/4.5, 26; 248/512, 534, 540

(56) References Cited

U.S. PATENT DOCUMENTS

| | | | |
|---|---|---|---|
| D. 301,514 | 6/1989 | Eccles | D22/142 |
| 2,448,752 | * 9/1948 | Wagner | 248/512 |
| 2,816,393 | * 12/1957 | Kmonk | 43/25 |
| 3,050,898 | * 8/1962 | Bernd | 43/25 |
| 3,074,674 | * 1/1963 | Hill | 248/512 |
| 3,113,363 | * 12/1963 | Fyvie | 43/26 |
| 3,992,303 | 11/1976 | Oakes | 43/25 |
| 4,593,877 | * 6/1986 | Van Der Wyk | 248/512 |
| 4,768,303 | 9/1988 | Baylink | 43/18.1 |
| 5,533,295 | * 7/1996 | Hochberger | 248/512 |
| 5,794,375 | * 8/1998 | Wright | 43/25 |

FOREIGN PATENT DOCUMENTS

0770371 * 3/1957 (GB) .................................... 43/18.1

* cited by examiner

*Primary Examiner*—Kurt Rowan
(74) *Attorney, Agent, or Firm*—Stratton Ballew PLLC

(57) ABSTRACT

An off-axis adapter for a parallel, offset fishing rod coupling is provided. The adapter includes a ferrule having two ends. The ends of the ferrule are each attached to a support and each support has a rod mount and a ferrule connection. The rod mounts each attach to a primary rod at mounting points, and the ferrule connections attach to the ferrule proximate to each respective end of the ferrule. The ferrule receives and maintains a secondary rod in a substantially parallel configuration in relation to the primary rod. Because the adapter is attached from the length or side of the host or primary rod, the installation of the adapter does not require matching dimensions of a host rod and a bushing. The adapter is installed onto a side portion of a fishing rod that has already been built and does not require removal of fishing rod components. The adapter is flexible to the natural and bending action of the rod, and substantially eliminates stiffening and stress on the fishing rod as compared with conventional off-axis adapters. The adapter can also include a housing guide hole through which a fishing line can be threaded to preclude interference from the side adapter.

8 Claims, 4 Drawing Sheets

ADAPTER FOR AN OFFSET FISHING ROD COUPLING

TECHNICAL FIELD

The invention relates to a fishing rod attachment apparatus and a method for installing the rod attachment to the fishing rod, and more particularly to an adapter apparatus for an offset and parallel rod coupling that attaches to a conventional fishing rod.

BACKGROUND OF THE INVENTION

Fishing rods typically include structural attachments for many purposes. For example, fishing line guides are usually mounted to the rod at short intervals. Another type of attachment structure is utilized to attach a reel to the fishing rod. The reel attachment typically includes a pair of bushings that have threaded washers on the rod to tighten the bushings and secure the reel to the rod. Additional structures include end ferrules or bushings for the end-to-end connection of multiple rod sections. These end ferrules typically mount to the ends of fishing rod sections and usually include a receptacle base that receives a rod end extension from the adjoining rod. This end-to end ferrule connector can also be called a co-axial connector, because the two rod sections share the same axis when joined.

The present invention relates to an improved off-axis adapter as opposed to the co-axial adapter discussed above. Off-axis adapters align two rod sections in an off-axis, yet substantially parallel relation to each other. Such off-axis adapters can be employed where a rod or device must be joined parallel to a fishing rod. Examples of fishing rods with off-axis adapters include "Compound Fishing Rods™," which are manufactured by Sisters Compound Rods of Sisters, Oregon, which are side-by side telescoping rods and rods that comprise an auxiliary device such as a spring bobber or a strike indicator.

A typical off-axis adapter for joining rods comprises an elongated housing with two bushings or ferrules, each off-axis to the other. One bushing acts as the base of the adapter, which attaches to a first rod and the second bushing acts as a receptacle for a second rod. The base is joined with the first, or host rod by inserting one end of the host rod into the base bushing. The second, or guest rod is attached to the adapter receptacle by inserting one end of the guest rod into the receptacle bushing. This adapter attachment joins the guest and host rods in an off-axis relationship to each other.

These adapters with pairs of bushings have substantial structures connecting the first bushing to the second bushing. Therefore these bushing pairs include thick cross-sectional areas parallel to the bushing axis. Consequently, the adapters are substantially rigid and stiff and are heavier than neighboring fishing rod attachments, such as line guides.

The paired bushing adapter constrains and stiffens the fishing rod over the length of the base bushing. This stiffening impairs the flexibility and action of the host fishing rod, including the flex of the rod along the length of the bushing. Also, the added weight of the paired bushing adapter further impairs the action of the rod because of a resultant increase in inertia. Additionally, when the host fishing rod bends in reaction to a force, a high stress develops in the rod near the ends of the bushing. The stress can cause the host rod to fracture from a smaller bending force than that at which it would fracture without a bushing. The dimensions of the base bushing and host rod must be closely matched when installing such an adapter. The need to compensate for bushing stiffness and precisely match the diameter of the base bushing with the diameter of the host rod makes the building of a fishing rod with off-axis adapters more difficult than building conventional co-axial rods. A bushing adapter is needed that allows the rod to maintain its normal and existing rod flex, which is by design, unconstrained by a sleeved bushing.

Further, it is sometimes desired to install an adapter on a fishing rod that has already been built. Such a retrofit installation is even more difficult with a bushing because of a need to first remove rod components before the host rod can be inserted into the bushing. Additional problems can occur when the off-axis adapter is desired on the same side of the fishing rod as that to which line guides are attached. An adapter that is co-linear with the line guides can interfere with a fishing line when in use.

Consequently, building fishing rods that comprise conventional off-axis adapters with conventional base bushings is difficult. Further, the action and strength of fishing rods having such adapters are substantially impaired because of the bushing.

There is, therefore, a need for an adapter that is easier to install, and that can be installed on a fishing rod without the need to first remove fishing rod components.

There is also a need for a lighter weight adapter that, when attached to a fishing rod, is substantially rigid and strong but does not impair the flexibility and strength of, or add undesirable weight and inertia, to the fishing rod.

Furthermore, there is a need for an adapter for off-axis joining that, when installed co-linear with line guides, does not interfere with the fishing line when in use.

Prior patents that relate to various types of off-axis adapters for fishing rods include French Patent 2,723,511 to Poullain (1996), and the following U.S. Pat. Nos.: Des. 301,514 to Eccles(1987); 4,768,303 to Baylink (1987); and 3,992,799 to Oakes (1975). However, none of these patents describe or suggest solutions to the combination of disadvantages described in the foregoing paragraphs. For example, all show an adapter base that comprises a ferrule or bushing into which a rod must be inserted for joining. Other patents show a variety of co-axial adapters with ferrules for joining rod sections end-to-end. However, such co-axial adapters with end-to-end joining ferrules inherently teach away from off-axis rod joining.

SUMMARY OF INVENTION

The present invention provides an off-axis adapter for a parallel, offset fishing rod coupling. The adapter includes a ferrule having a first end and a second end. The first end of the ferrule is attached to a first support. The first support has a first rod mount and a first ferrule connection. The first rod mount is attachable to a primary rod at a first mounting point, and the first ferrule connection is attached to the ferrule proximate to the first end of the ferrule. The second end of the ferrule is attached to a second support. The second support has a second rod mount and a second ferrule connection. The second rod mount is attachable to a primary rod at a second mounting point, and the second ferrule connection is attached proximate the second end of the ferrule. The ferrule receives and maintains a secondary rod in a substantially parallel configuration in relation to the primary rod.

The method of the invention includes attaching the first rod mount of the ferrule to the primary rod at the first mounting point, and attaching the second rod mount of the ferrule to the primary rod at the second mounting point. A secondary rod is then inserted into the ferrule, the ferrule for maintaining the secondary rod in a substantially parallel configuration in relation to the primary rod.

According to one aspect of the invention, because the adapter is attached from the length or side of the host or primary rod, the installation of the adapter does not require matching dimensions of a host rod and a bushing, thereby easing the installation.

According to another aspect of the invention, an apparatus is provided for installation onto a side portion of a fishing rod that has already been built and does not require removal of fishing rod components, thereby further easing the installation.

According to another aspect of the invention an apparatus is provided that, when installed on a rod, is flexible to the natural and bending action of the rod, as designed. This flexibility of the adapter substantially eliminates the stiffening and additional stress on the fishing rod that are introduced by conventional off-axis adapters.

According to yet another aspect of the invention an apparatus is provided that is lightweight, thereby reducing the weight and inertia of the fishing rod to which it is attached.

According to still another aspect of the invention an apparatus is provided that precludes interference with the fishing line when installed co-linear with the fishing rod line guides.

Further objects and advantages include providing an apparatus that can be easily produced with components and processes used on conventional fishing rods. Still further objects and advantages of the invention will become apparent from consideration of the figures and ensuing description.

The foregoing objects are achieved with a side adapter that can be installed from, and attached to, the side of a fishing rod. The side-mounting adapter is easy to install. It is lightweight and flexible, and responds to the bending of the host rod, to which it is attached. Further, the side adapter can alternatively include a housing guide hole through which a fishing line can be threaded to preclude interference from the side adapter.

DETAILED DESCRIPTION OF SPECIFIC EMBODIMENTS

Figure 1:
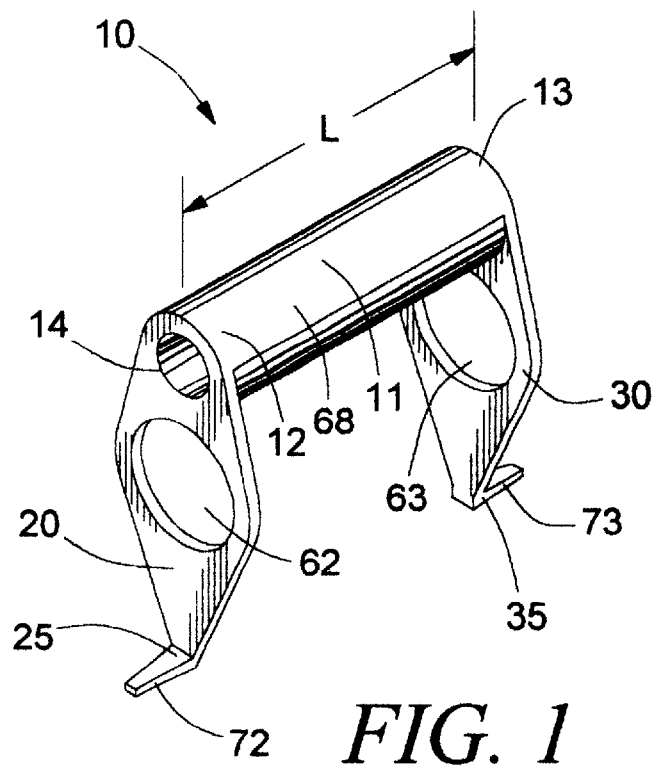
FIG. 1 is a perspective view of an adapter for a parallel fishing rod coupling, according to an embodiment of this invention.
Figure 2:
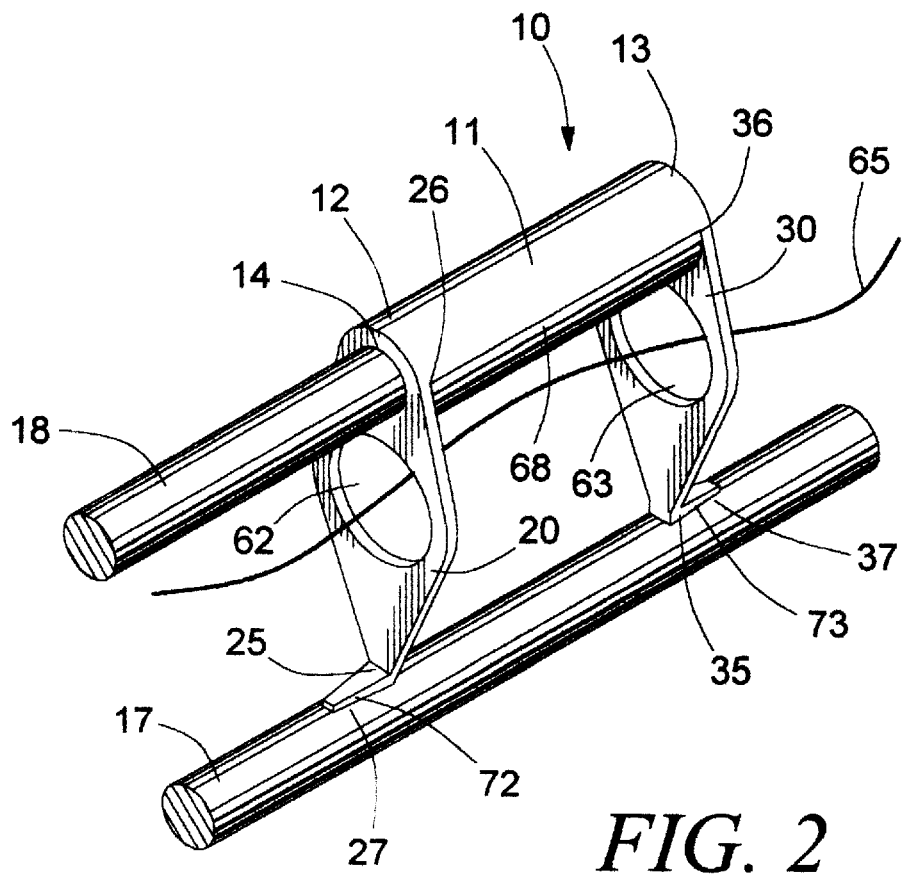
FIG. 2 is a perspective view of an adapter for a parallel fishing rod coupling, according to an embodiment of this invention.

The invention provides an adapter for a parallel offset fishing rod coupling. FIGS. 1 through 5 illustrate specific embodiments of the adapter 10, which is essentially a rod coupling for a coupled pair of offset segments of a fishing rod. FIGS. 1 and 2 show a preferred embodiment of the adapter that includes a ferrule 11 having a first end 12 and a second end 13. The ferrule is a cylindrical housing or bushing that has a first support 20 at the first end of the ferrule and a second support 30 at the second end of the ferrule.

As detailed in FIG. 2, the segments of the fishing rod include a primary rod 17 onto which the adapter 10 mounts. Additionally, a secondary rod 18 is received into the ferrule 11 of the adapter. The ferrule includes a receptacle 14 at its first end 12, which acts as a receiver for the secondary rod. The first support 20 of the ferrule, also at the first end of the ferrule, includes a first rod mount 25 and a first ferrule connection 26. The first ferrule connection of the first support attaches to the ferrule proximate the first end of the ferrule. The first rod mount of the first support is attachable to the primary rod at a first mounting point 27. Similarly, the second support 30 of the ferrule includes a second rod mount 35 and a second ferrule connection 36. The second rod mount of the second support is attachable to the primary rod at a second mounting point 37. Also, the second ferrule connection of the second support attaches to the ferrule proximate the second end of the ferrule 13.

The ferrule 11 of the adapter 10 receives and maintains the secondary rod 18 in a substantially parallel and adjacent configuration in relation to the primary rod 17, onto which the adapter is mounted. The primary rod can also be called a host rod, in that it supports the adapter and the secondary rod, which is called a guest rod. The primary rod can be any conventional fishing rod, as the first rod mount and the second rod mount 35 are configured to mount to a rod of any typical diameter or material.

Additionally, the ferrule 11 has a length L, as shown in FIG. 1. The first support 20 is substantially separated from the second support 30 by the length of the ferrule. This separation of the first support and second support imparts the improved flexing properties that make this improved adapter 10 significantly superior to conventional off-axis adapters having solid and continuous mountings to the primary rod that substantially run the full length of the ferrule. The ferrule allows the primary rod to maintain a normal rod flexing, unconstrained by a ferrule attachment sleeve, as found in conventional ferrules.

Figure 4:
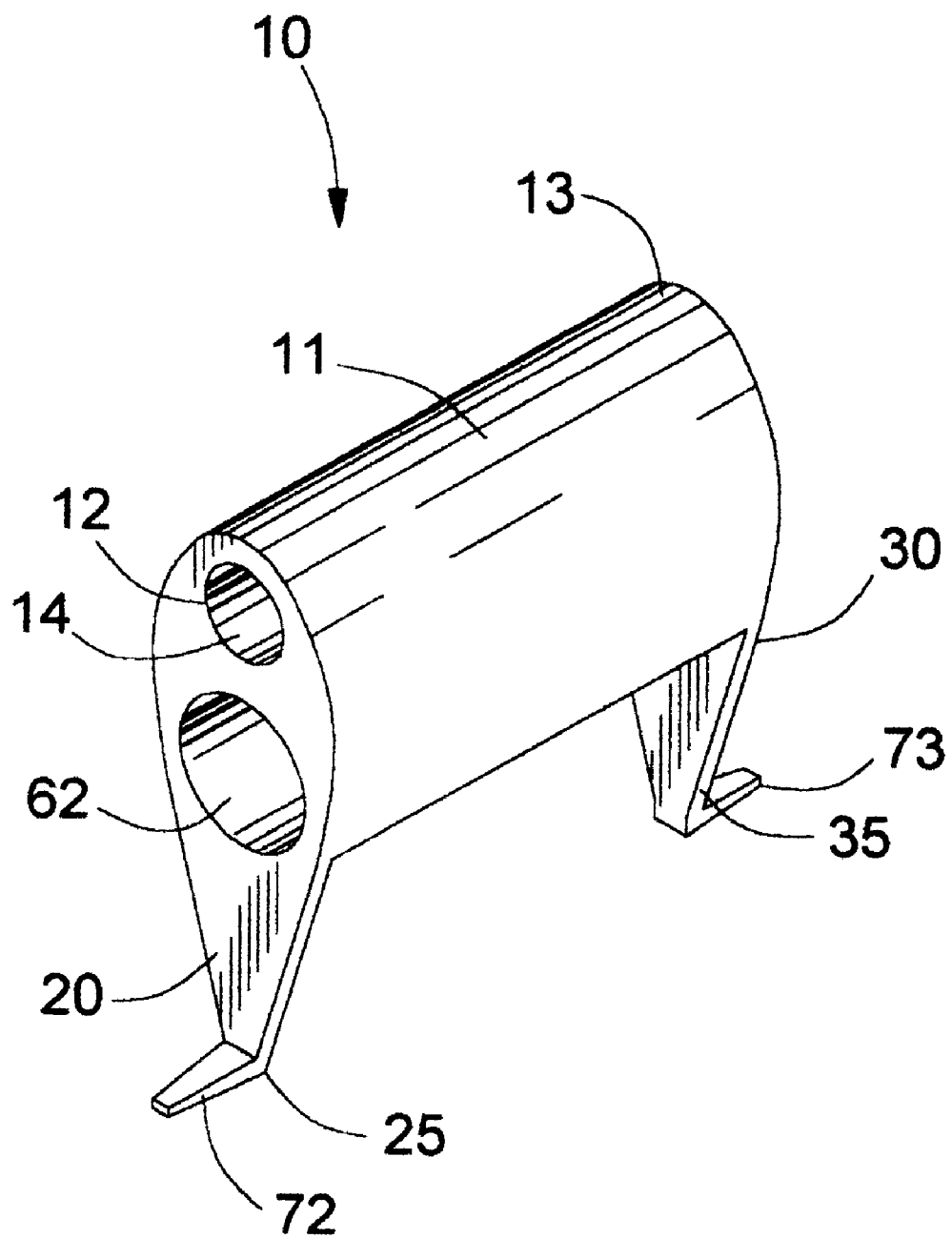
FIG. 4 is a perspective view of an adapter for a parallel fishing rod coupling, according to an embodiment of this invention.

As a preferred embodiment of the adapter of the present invention, the first support 20 can include a first line penetration 62, and the second support 30 can include a second line penetration 63, as shown in FIGS. 2 and 4. The first line penetration and the second line penetration are line guides, which can be embodied by holes, openings or structures for receiving a fishing line 65. This alternative, line penetration embodiment is preferred when the fishing line is located on the same side of the primary rod as the adapter.

Figure 5:
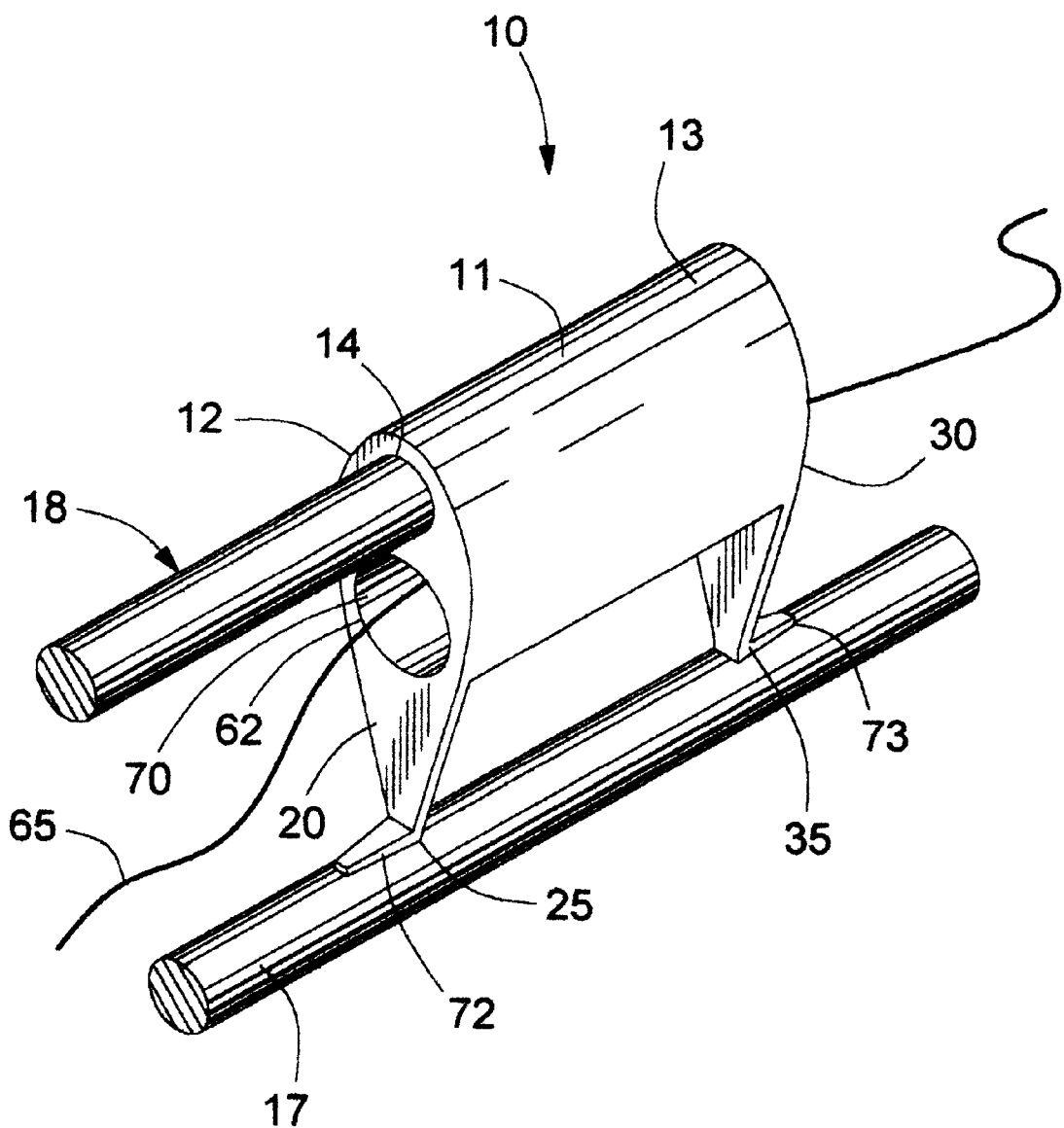
FIG. 5 is a perspective view of an adapter for a parallel fishing rod coupling, according to an embodiment of this invention.

Alternatively, as shown in FIG. 5, the first support 20 and the second support 30 of the adapter 10 do not require line penetrations that guide the fishing line 65 between the ferrule and the primary rod. Instead, a line guide 70 can be additionally attached to the ferrule.

Though the adapter 10 can be mounted to any lengthwise surface of the primary rod 17, for ease of description, the orientations depicted in the attached drawings show the adapter mounted above the primary rod. The portion of the ferrule 11 that faces the primary rod can be referred to as the underside 68 of the ferrule. The ferrule can be attached to the primary rod without the disassembly of the primary rod, as is required with conventional, sleeved ferrules. The sleeved ferrule must slip over the tip, or terminal end of a rod section and therefore requires any existing line guides or ferrules to first be removed from the rod. The ferrule of the adapter of the present invention mounted along an outside length, or the side of the primary rod, without requiring a sleeve, and therefore can be attached without disassembling the primary rod.

When the adapter 10 is attached in a co-linear orientation with other line guides (not shown) of the primary rod 17, the fishing line 65 can be threaded through the adapter to preclude interference from the adapter. The line guide 70, as detailed in FIG. 5 is preferably mounted to the underside 68 of the ferrule 11. The fishing line is then threaded through the first support 20, the line guide, and the second support 30 of the adapter 10.

Figure 3:
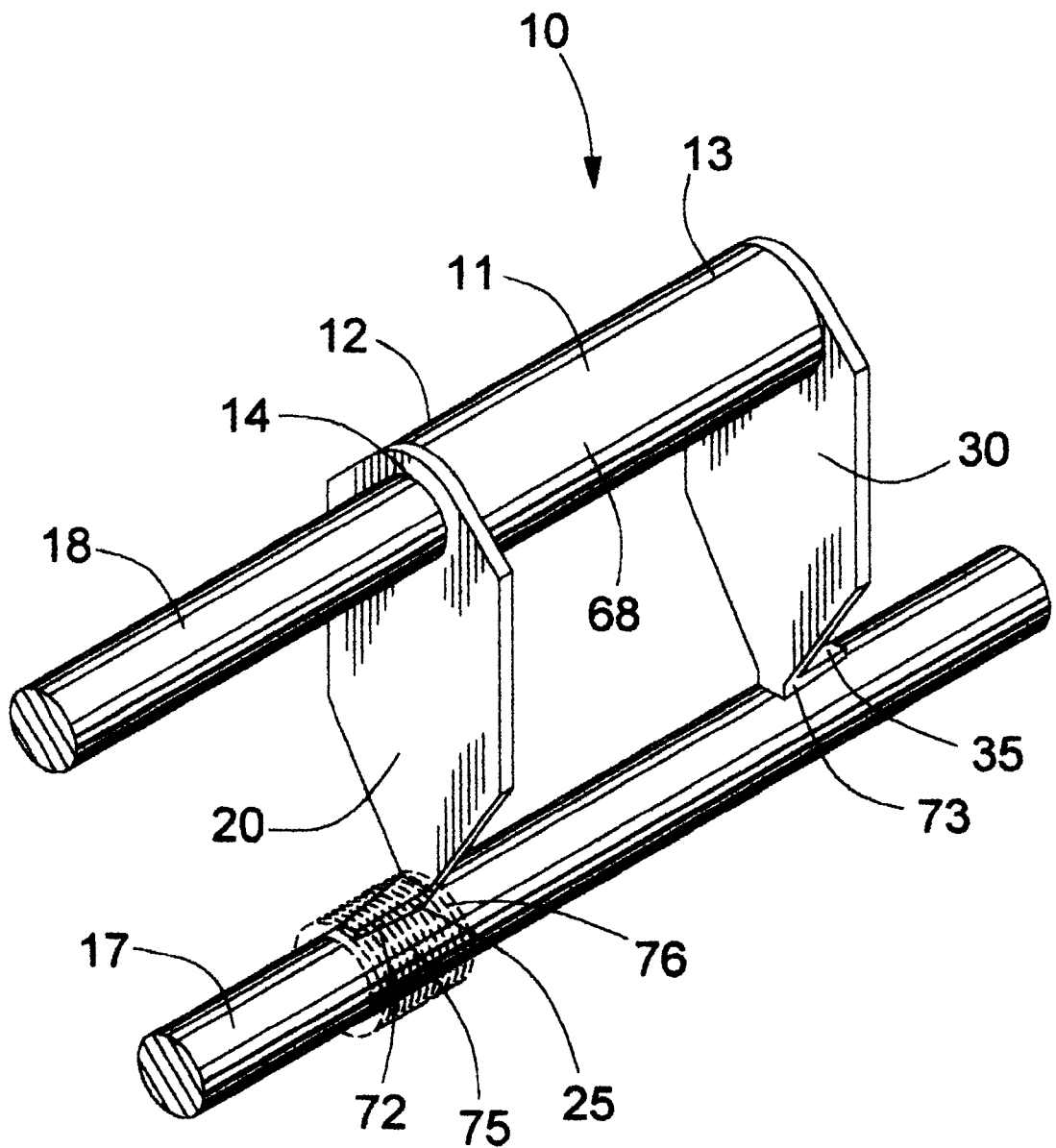
FIG. 3 is a perspective view of an adapter for a parallel fishing rod coupling, according to an embodiment of this invention.

Also alternatively, the adapter 10 can mount on the primary rod 17 in positions that do not require penetrations for the fishing line 65. As FIGS. 3 and 5 illustrate, the first support 20 and the second support 30 do not require line penetrations.

Many conventional attachment techniques can be employed to attach the first rod mount 25 and the second rod mount 35 of the adapter 10 to the primary rod 17. The attachment is the actual bonding method employed to securably and immovably attach the rod mounts to the primary rod. The first rod mount of the first support preferably includes a first foot 72 for mounting onto the primary rod, and the second rod mount of the second support includes a second foot 73 for mounting to the primary rod. The first foot and the second foot are preferably attached to the primary rod by first wrapping them with a thread material 75 to secure them firmly to the primary rod, and then applying a suitable epoxy 76, or bonding agent over the thread to achieve a strong and permanent mounting, as detailed in FIG. 2. Alternatively, bands of metal or plastic could be employed to hold the first foot and the second foot to the primary rod.

The first support 20 and the second support 30 each impart improved structural properties of stiffness and flexibility to the adapter of the present invention as compared with conventional, off axis adapters. The first and second supports are substantially stiff and resistant to twisting about the ferrule 11. However, the first and second supports specifically allow for the primary rod 17 to flex between the first rod mount 25 and the second rod mount 35. For such directionally specific stiffness and flexibility, the first ferrule connection 26 and the second ferrule connection 36 are substantially rigid, as with the mounting of the first and second supports to the primary rod. The first and second supports are flexible to the bending of the primary rod. Thereby, the host, primary rod is not substantially stiffened by the attachment of the improved adapter.

For the installation of the adapter 10 of the present invention, methods for fabrication and methods for mounting can be employed that are conventionally used in other fishing rod components. When installed on a fully functional primary rod 17, the ferrule 11 of the present invention is essentially a side-mounted adapter. The term side-mounting refers to an installation of the adapter other than the conventional slide-on, sleeved mounting that is required of typical adapters. The adapter of the present invention can be installed along the length of the primary rod, and so side-mounted to the primary rod, instead of inserted onto the terminal end of a stripped down rod, which then must be reassembled.

Typical materials of construction for the ferrule 11 can be utilized, and preferably include aluminum, hard carbon steel, stainless steel and carbon compositions. As a preferred alternative, the ferrule, as well as the entire adapter, as shown in FIGS. 4 and 5, can be manufactured from a ceramic material. Ceramics are desirable in handling fishing lines because they are typically very smooth and do not build up heat from line friction. Also alternatively, the first support 20 and the second support 30 can be fabricated from a stamped metal, as shown in FIGS. 1 through 3. As an additional, preferred alternative, the first support and the second support can be manufactured from a wire, as shown in FIG. 5. Most preferably the wire is a stainless steel alloy.

The fabrication and mounting of the adapter 10 to the primary rod 17 includes fabricating the ferrule 11 with the first support 20 and the second support 30 as an integral unit by use of conventional stamping, machining or molding processes. An example of such a unitary adapter is shown in FIGS. 4 and 5.

An alternative fabrication technique includes first forming the ferrule 11 and first support 20 and the second support 30 as independent components then joining them to each other by using conventional brazing, bonding or molding processes. Such an adapter 10, similar to that shown in FIGS. 1 and 2, has been developed and used successfully in a Compound Fishing Rod™. It weighs approximately 1.4 gm (0.05 oz) and comprises a volume 19 mm (0.75 in) long, 25 mm (1 in) high, and 15 mm (0.6 in) wide.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible that employ the same inventive concepts as described above. Therefore, the invention is not to be limited, except by the following claims, as appropriately interpreted in accordance with the doctrine of equivalents.

What is claimed is:

1. An adapter for a parallel offset fishing rod coupling, the adapter comprising:

a ferrule having a first end and a second end;

a first support having a first rod mount and a first ferrule connection, the first rod mount attachable to a primary rod at a first mounting point, and the first ferrule connection attached proximate the first end of the ferrule;

a second support having a second rod mount and a second ferrule connection, the second rod mount attachable to a rod at a second mounting point, and the second ferrule connection attached proximate to the second end of the ferrule, the ferrule for receiving a secondary rod; and the first rod mount of the first support having a first foot for mounting the first rod mount onto the primary rod, the second rod mount of the second support having a second foot for mounting the second rod mount onto the primary rod, the first foot perpendicular to the first support, and the second foot perpendicular to the second support.

2. The adapter of claim 1, wherein:

the ferrule has a length, and the first support is substantially separated from the second support by the length of the ferrule to allow normal flexing of the primary rod between the first mounting point and the second mounting point.

3. An adapter for a parallel offset fishing rod coupling, the adapter comprising:

a ferrule having a first end and a second end;

a first support having a first rod mount and a first ferrule connection, the first rod mount attachable to a primary rod at a first mounting point, and the first ferrule connection attached proximate the first end of the ferrule;

a second support having a second rod mount and a second ferrule connection, the second rod mount attachable to the primary rod at a second mounting point, and the second ferrule connection attached proximate the second end of the ferrule, the ferrule for receiving a secondary rod, the first support includes a first line penetration for receiving a fishing line, and the second support includes a second line penetration for receiving a fishing line; and the first line penetration completely enclosed within the support, and the second line penetration completely enclosed within the second support.

4. The adapter of claim 3, additionally wherein:

the ferrule includes an underside, the underside of the ferrule substantially adjacent to the primary rod; and a line guide attached to the underside of the ferrule.

5. The adapter of claim 3, wherein:

the ferrule has a length, and the first support is substantially separated from the second support by the length of the ferrule to allow normal flexing of the primary rod between the first mounting point and the second mounting point.

6. The adapter of claim 3, wherein:

the first rod mount of the first support includes a first foot for mounting onto the primary rod, and the second rod mount of the second support includes a second foot for mounting to the primary rod.

7. A method for mounting an adapter for an offset fishing rod coupling to a conventional and fully functional fishing rod, the method including the steps of:

a) attaching a first support to a ferrule, proximate a first end of the ferrule;

b) attaching a second support to the ferrule, proximate a second end of the ferrule;

c) side-mounting the first support to a primary rod at a first mounting point of the primary rod;

d) side-mounting the second support, to the primary rod at a second mounting point of the primary rod; and e) inserting a secondary rod into the ferrule.

8. The method for mounting an adapter of claim 7, wherein:

the step of side-mounting the first rod support to the primary rod includes mounting a first rod mount of the first rod support to the first mounting point of the primary rod and, the step of side-mounting the second rod support to the primary rod includes mounting a second rod mount of the second rod support to the second mounting point of the primary rod.

* * * * *